United States Patent
Wong (12) 
(10) Patent No.: US 6,645,551 B2
(45) Date of Patent: Nov. 11, 2003

(54) MAGNETIC RECORDING MEDIUM UNDERLAYER AND METHOD FOR OBTAINING A DESIRED LATTICE PARAMETER THEREFOR

(75) Inventor: Bunsen Y. Wong, Los Gatos, CA (US)

(73) Assignee: Maxtor Corporation, Longmont, CO (US)

( * ) Notice: Subject to any disclaimer, the term of this patent is extended or adjusted under 35 U.S.C. 154(b) by 33 days.

(21) Appl. No.: 09/408,153

(22) Filed: Sep. 29, 1999

(65) Prior Publication Data

US 2003/0129453 A1 Jul. 10, 2003

(51) Int. Cl.[7] .............. B05D 5/12; G11B 5/66; G11B 5/70
(52) U.S. Cl. .............. 427/128; 427/131; 427/132
(58) Field of Search ............. 428/694 TS, 694 TP; 427/128, 131, 132

(56) References Cited

U.S. PATENT DOCUMENTS 4,652,499 A    3/1987  Howard .............. 428/641
5,693,426 A  * 12/1997  Lee et al. .............. 428/611
5,900,324 A  *  5/1999  Moroishi et al. .............. 428/611
6,001,447 A  * 12/1999  Tanahashi et al. .............. 428/65.3
6,551,703 B1 *  4/2003  Falcone et al. .............. 428/336

OTHER PUBLICATIONS

David N. Lambeth et al., "Magnetic Media Performance: Control Methods for Crystalline Texture and Orientation", submitted for publication in *MRS Proceedings* MRS Sym L: paper #L8.1, Apr. 15, 1998 (Jun. 1, 1998), 12 pages.

* cited by examiner

Primary Examiner—Holly Rickman
(74) Attorney, Agent, or Firm—David M. Sigmond (57) ABSTRACT

An underlayer (8A) of a magnetic recording medium (16) includes first and second non-magnetic, chromium-based layers (18, 20), at least one of the first and second chromium-based layers being a chromium alloy. The lattice parameter of the composite underlayer is between the lattice parameters of the first and second chromium-based layers. Recognizing this permits one to predictably adjust the lattice parameter of the composite underlayer to be close to the lattice parameter of the magnetic layer (10) so to optimize magnetic and parametric properties.

21 Claims, 7 Drawing Sheets

CrV$_{20}$: 2.90Å

MAGNETIC RECORDING MEDIUM UNDERLAYER AND METHOD FOR OBTAINING A DESIRED LATTICE PARAMETER THEREFOR

BACKGROUND OF THE INVENTION

Figure 1:
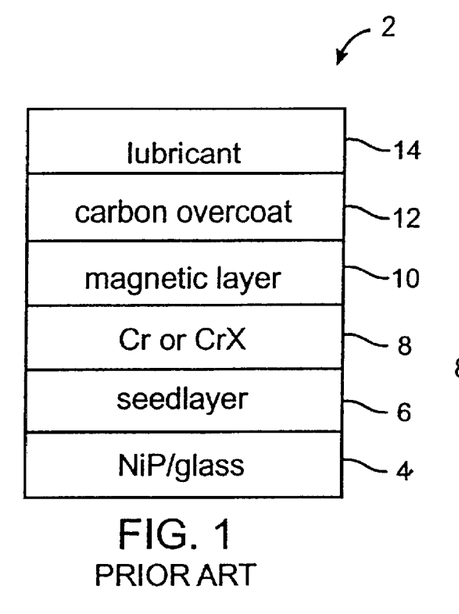
FIG. 1 is a schematic representation of a conventional thin-film magnetic recording medium, typically a thin-film disk.
Figure 1A:
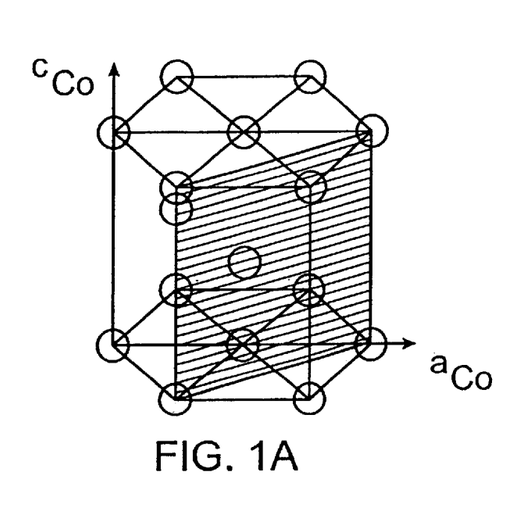
FIGS. 1A–1D illustrate epitaxy between Co and Cr with matching of interatomic distances.
Figure 1B:
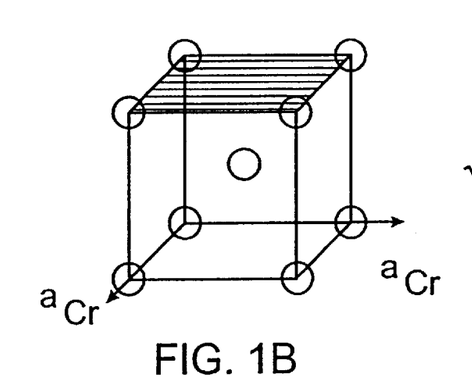
Figure 1C:
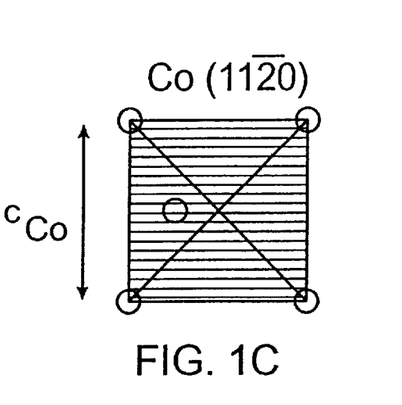
Figure 1D:
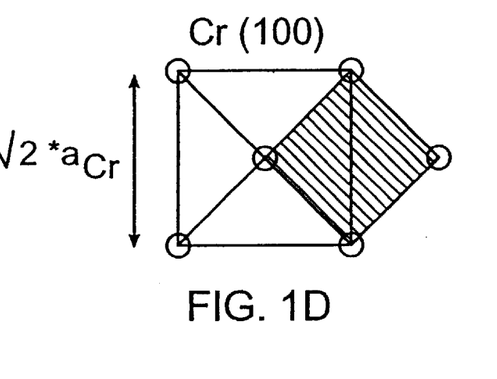

Magnetic thin film recording disks are commonly manufactured by a series of sputtering processes in an environment of low pressure inert gases. Disk 2, see FIG. 1, is commonly comprised of a substrate 4 made of nickel phosphorus (NiP) or ceramic glass, an optional magnetic seedlayer 6, a non-magnetic underlayer 8, made of either pure chromium (Cr) or a chrome alloy (CrX), covered by a magnetic layer 10 made of a cobalt (Co)-based alloy. A protective layer 12 made of sputtered carbon is typically used on top of the magnetic layer and an organic lubricant 14 may be used on top of the protective layer. It has been found that it is important to match the underlayer and magnetic layer lattice parameters for thin films in longitudinal recording. In the case of body centered cubic (bcc) Cr or CrX underlayer, the lattice dimension is defined by the parameter aCr. For hexagonal close-packed (hcp) Co alloy, the lattice dimension is defined by two orthogonal vectors: aCo and cCo. See FIGS. 1A–1D. For a well-matched Co/Cr film stack, $\sqrt{2}\, a_{Cr} = c_{Co}$.

Lattice matching between the Cr or CrX underlayer and the Co alloy magnetic layer is commonly done to achieve optimal magnetic and parametric properties. See D. E. Laughlin et al., *Scripta Metallurgica et Materialia* 33, 1525 (1995).

Common Co alloys include chromium (Cr), platinum (Pt), boron (B), niobium (Nb), tungsten (W) and tantalum (Ta). While the cobalt platinum alloy has a hexagonal close-packed (hcp) crystalline structure, the chromium-based underlayer has a body centered cubic (bcc) lattice structure. With the addition of platinum, the CoPt-based alloys have a larger lattice structure than the chromium-based underlayer so that elements such as Vanadium (V), Molybdenum (Mo), titanium (Ti) and tungsten (W) have been used to create chromium-based alloys to accommodate the larger lattice of the CoPt-based magnetic layers and maintain lattice union across the interface between the two. These alloys expand the unit cell structure so as to improve the lattice matching between the underlayer and the magnetic film because of the larger sized atoms of the alloying elements.

One of the problems with the conventional method for trying to match the lattice perimeter of the chromium-based underlayer with the CoPt-based magnetic layers is that it requires incremental experimentation with chromium alloying as to both what is used and the percentages. Therefore, each time the composition of the cobalt-based magnetic layer changes, which occurs relatively often as improved magnetic layers are developed, the composition of the chromium-based underlayer must be changed to complement the changed composition of the magnetic layer. However, this composition adjustment is tedious, time-consuming and, thus, expensive.

SUMMARY OF THE INVENTION

The present invention is directed to an underlayer of a magnetic recording medium in which the underlayer includes first and second non-magnetic, chromium-based layers, at least one of the first and second chromium-based layers being a chromium alloy. The lattice parameter of the composite underlayer is between the lattice parameters of the first and second chromium-based layers. Recognizing this permits one to predictably adjust the lattice parameter of the composite underlayer to be close to the lattice parameter of the magnetic layer so to optimize magnetic and parametric properties.

Another aspect of the invention relates to a method for obtaining a desired lattice parameter of a non-magnetic underlayer in the manufacture of a magnetic recording medium of the type comprising a substrate, a non-magnetic underlayer on the substrate, and a magnetic layer on the underlayer. The method includes determining a desired lattice parameter, typically the lattice parameter of the magnetic layer, for the underlayer. A number of non-magnetic, chromium-based layers, typically two, are selected for the underlayer, at least one of the chromium-based layers is a chromium alloy. The thickness of each chromium-based layer is chosen according to the desired lattice parameter, the sum of the thicknesses of each of the chromium-based layers being equal to the underlayer thickness. One way of choosing the thicknesses of the chromium-based layers is to use a plot of the ratio of the two thicknesses of the two chromium-based layers versus corresponding (002) interplanar spacing as the lattice parameter. The choosing step is preferably carried out so that the difference between the lattice parameter of the underlayer and the desired lattice parameter, typically the lattice parameter of the magnetic layer, is minimized. The final lattice parameter of this composite underlayer lies between the lattice parameters of the two respective Cr or CrX layers.

In some embodiments a protective layer is deposited on the magnetic layer, a lubricant is deposited on the protective layer and a non-magnetic seedlayer layer is provided between the substrate and the underlayer. The thickness of the underlayer is preferably less than about 350 Å, and more preferably between about 180–200 Å. The chromium-based layers are preferably between about 10–500 Å thick. If desired, more than two chromium-based layers may be used in making up the underlayer.

Other features and advantages of the invention will appear from the following description in which the preferred embodiment has been set forth in detail in conjunction with the accompanying drawings.

DESCRIPTION OF THE SPECIFIC EMBODIMENTS

Figure 3:
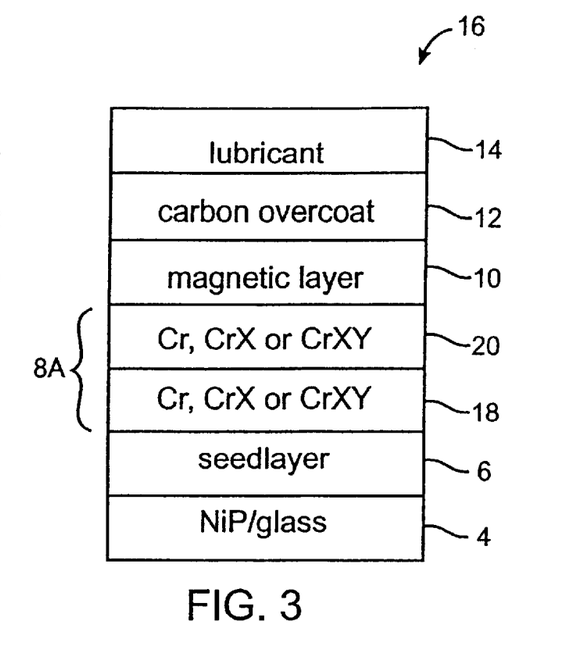
FIG. 3 is a schematic illustration of a magnetic recording medium made according to the invention including first and second chromium-based layers constituting the underlayer.

FIG. 3 is a simplified schematic illustration of a magnetic recording medium 16 made according to the invention. Magnetic recording medium 16 is similar to disk 2 of FIG. 1 with like elements referred to by like reference numerals. However, underlayer 8A is made up of a first non-magnetic, chromium-based layer 18 and a second non-magnetic, chromium-based layer 20. Additional chromium-based layers can also be used. Not all of the chromium-based layers are the same. Thus, if chromium-based layer 18 is plain chromium, then chromium-based layer 20 is a chromium alloy, typically CrX (with a single alloying element) or CrXY (with two alloying elements). If desired, a chromium-based layer can include chromium and three or more alloying elements. The alloying elements may be a variety of elements but typically are chosen from the following group: C, Mg, Al, Si, Ti, V, Co, Ni, Cu, Zr, Mo, Nb, La, Ce, Nd, Gd, Th, Dy, Er, Ta, W and Mn.

Each underlayer is typically a combination of two or more pure Cr, CrX or CrXY alloys as suggested in FIG. 3. The thicknesses of the chromium-based layers 18, 20 typically vary from about 1 nm to 50 nm. When deposited on a NiP substrate 4, the first deposited chromium-based layer 18 has a (002) fibrous texture and the subsequent chromium-based layer 20, and any additional chromium-based layers, assumes this (002) texture. When deposited on a glass substrate 4, the first deposited Cr-based layer will assume the texture of the seedlayer. This texture is also copied by the subsequently deposited Cr-based layers. The lattice parameter of underlayer 8A can be varied through this multilayer construction. The experimental (002) interplanar spacing, as measured by x-ray diffraction, varies linearly with the theoretical calculated values; see FIGS. 5–7. This theoretical value is obtained by the weighted thickness and lattice parameter average of the two layers:

$$a_{underlayer}=a_{CrX1}(t_{CrX1}/t_{Total})+a_{CrX2}(t_{CrX2}/t_{Total}) \quad (1)$$

$a$: lattice parameter, $t$: film thickness. $(t_{CrX1}+t_{CrX2}=t_{total})$

Figure 9:
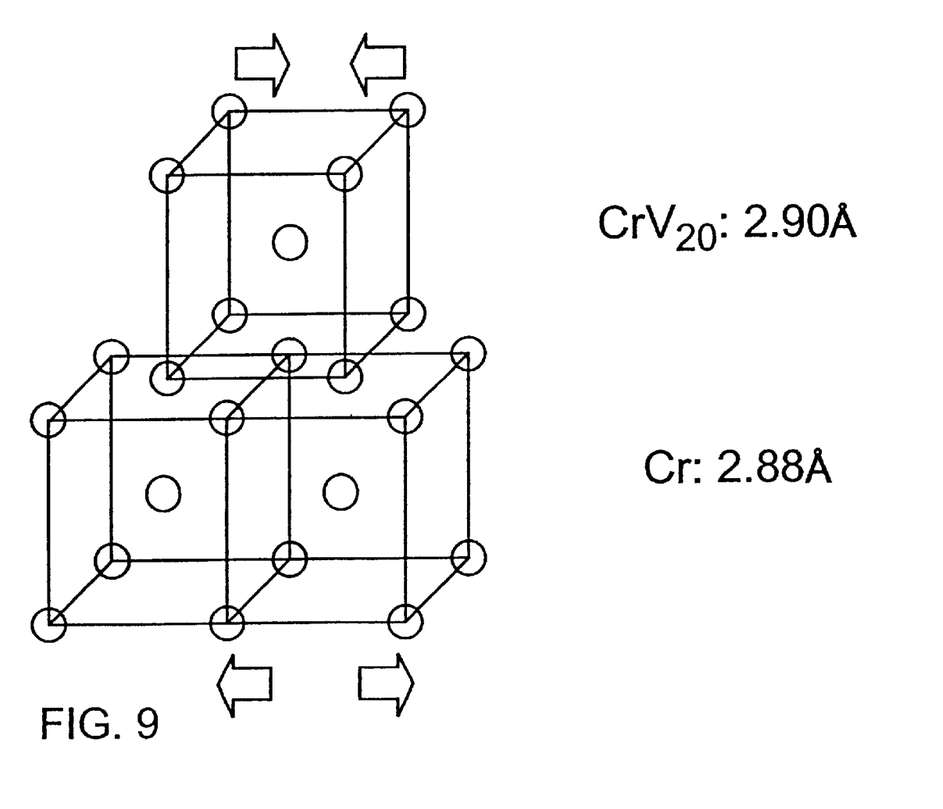
FIG. 9 suggests the effect of different lattice parameters of two chromium-based layers on an underlayer.

That is, the chromium-based layers 18, 20 have two different lattice parameters. Growing layer 20 on layer 18 causes the lattice parameter of the two layers to be pulled to an intermediate lattice parameter which becomes the lattice parameter of underlayer 8A. This is shown graphically in FIG. 9 in which chromium-based layer 18 is a pure chromium layer having an $a_{Cr}$ of 2.88 Å while layer 20 is a chromium vanadium alloy having an $a_{CrV20}$ of 2.90 Å. As indicated by the arrows, a smaller acr of layer 18 has a tendency to expand while the larger $a_{CrV20}$ of layer 20 is contracted so that the resulting lattice parameter of the underlayer will lie somewhere between the unrestrained lattice parameters of layers 18 and 20.

Figure 4:
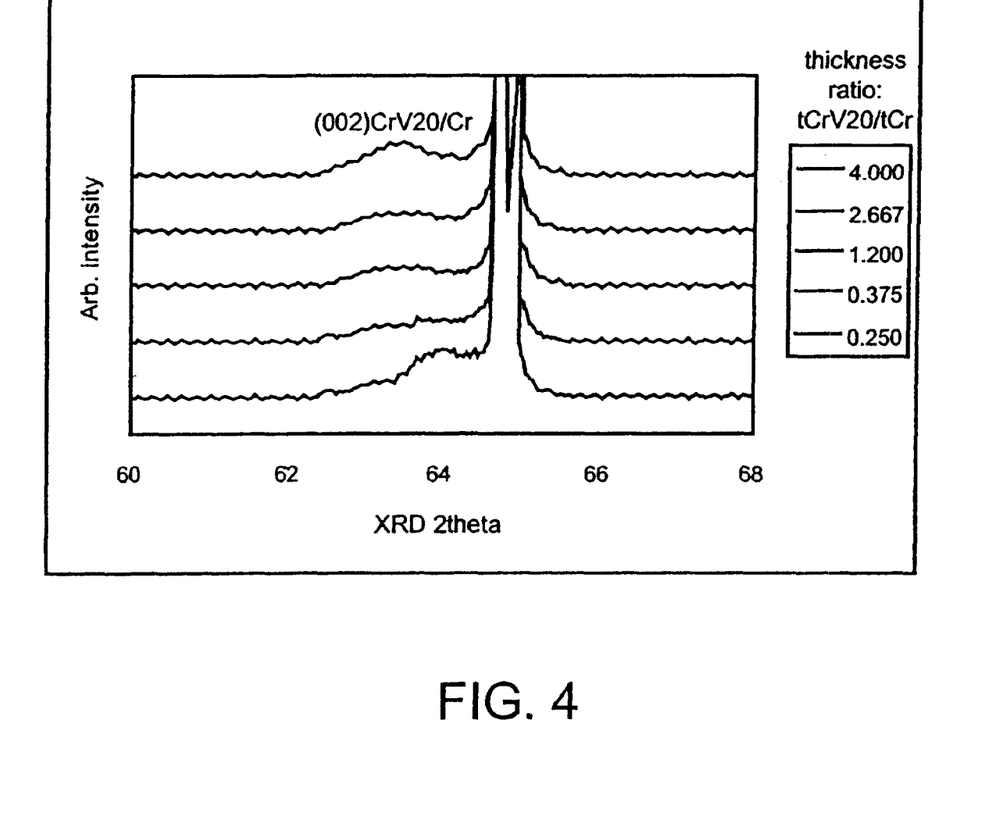
FIG. 4 plots x-ray diffraction spectra of CrV20/Cr films for different film thickness ratios.

The change in the lattice parameter is measured by the peak shift in the position of the (002) peak in the x-ray diffraction spectra as illustrated in FIG. 4. The origin of this lattice dimension change apparently stems from the coherent strain, caused by the epitaxial growth between the two chromium-based layers. The resulting bcc unit cell dimension can be predicted through the thickness fraction, fCrX, of the CrX/Cr chromium-based layer (in this embodiment).

$$fCrX=tCrX/tCrX+tCr \quad (2)$$

Figure 8:
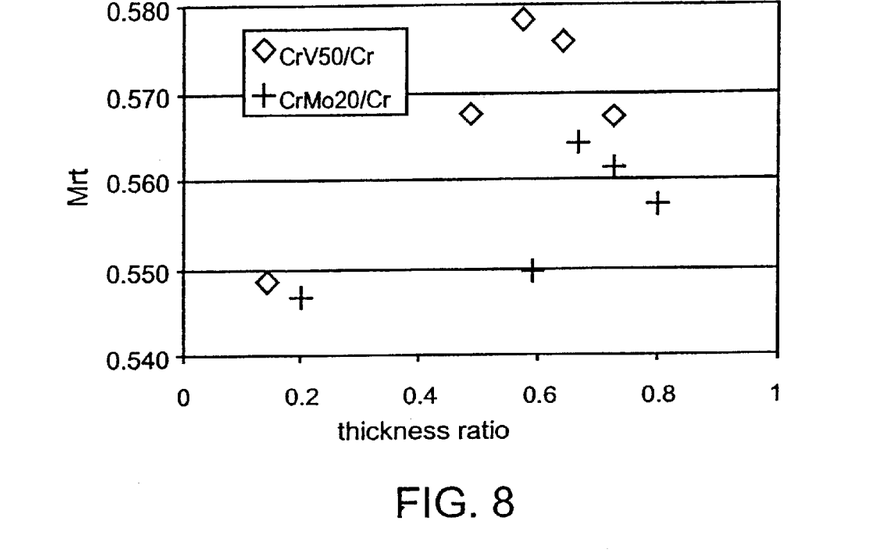
FIG. 8 plots the relationship between Mrt and thickness ratio of the thickness of CrV50 and of CrMo20 to the total underlayer thickness.

By fine-tuning the lattice parameter of the underlayer using this multilayer construction, it is possible to improve the lattice matching between the magnetic layer and this combination underlayer. As a result, the in-plane magnetization ratio can be enhanced even though the magnetic and total underlayer thickness remains constant (FIG. 8).

I. Experimental Procedures

CoCrTaPt/CrX (X: $V_{20}$, $V_{50}$, $Mo_{10}$, $Mo_{20}$) films were sputtered onto NiP substrates in an Intevac MDP250 static sputtering system. The lattice parameter of the CrX underlayer films was measured to gauge the effect of alloying element additions and its relation to weighted average atomic radius.

Films with a dual underlayer design: CoCrTaPt/CrX/Cr (X: $V_{20}$, $V_{50}$, $Mo_{20}$) were also sputtered (FIG. 3). The CrX/Cr thickness ratio was varied in order to induce the lattice dimension change in the layered underlayer. The total thickness of the underlayer and the CoCrTaPt layer were kept constant at 190±10 Å and 250 respectively. All the films were deposited at a substrate temperature of 260° C. The resulting films were characterized using θ–2θ x-ray diffraction (XRD) and remnant moment magnetometer (RMM). Parametric performance was measured on a Guzik 1401 spinstand using MR heads.

II. Results and Discussion

A. CrX Alloys

Figure 2:
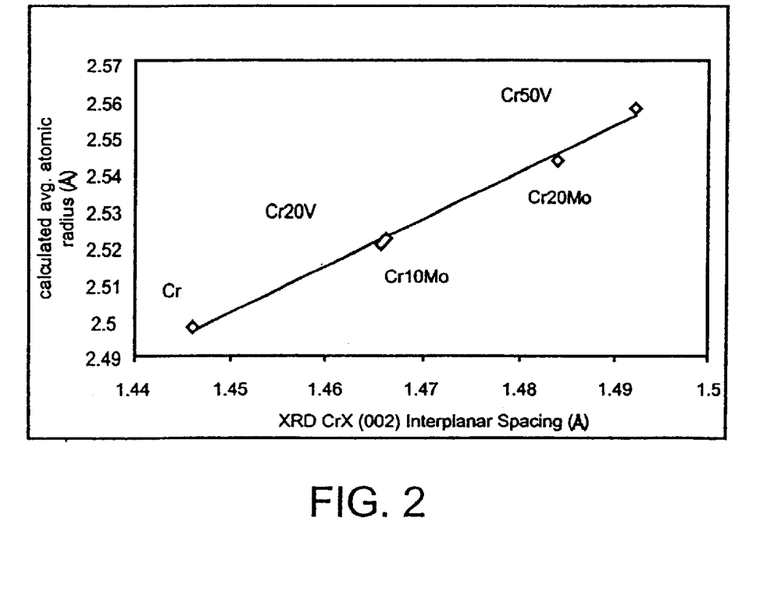
FIG. 2 is a plot of calculated average atomic radius for CrX bcc layers versus lattice parameter, in particular x-ray diffraction (002) interplanar spacing.

FIG. 2 plots the relationship between the CrX (200) interplanar spacing ($d_{200}$) of the sputtered films as measured by XRD and theoretical CrX atomic radius ($a_{CrX}$). Parameter $a_{CrX}$ was calculated using the weighted atomic radius average of Cr and element X:

$$a_{CrX}=a_{Cr}(1-r)+a_x r: \text{ at. }\% \quad (3)$$

There is a perfect correspondence between acrx and experimental values which indicates that the lattice parameter of miscible Cr alloys can be predicted using a linear law of mixing of the Cr and CrX atomic radius. The results can simplify composition selection of CrX alloys.

B. CrXICr Dual Underlayer

FIG. 4 shows the XRD spectra for different $CrV_{20}/Cr$ underlayers with different $t_{CrX}/t_{Cr}$. For pure Cr, the (002) peak would be located at 64.5. As the $CrV_{20}$ layer thickness is increased against a thinning Cr layer, the (002) peak shifts to a lower angle implying an expansion in the underlayer bcc lattice.

Figure 5A:
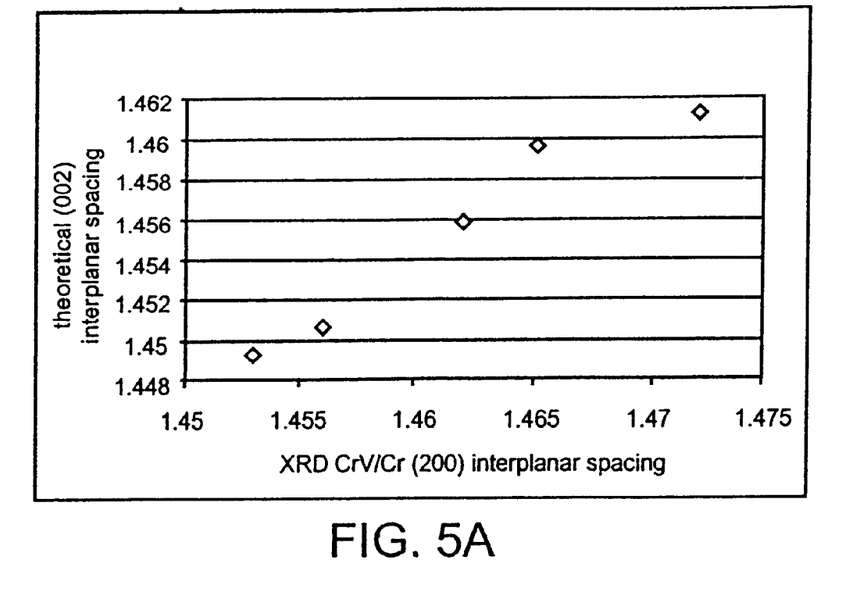
FIG. 5A plots theoretical (002) interplanar spacing versus x-ray diffraction CrV/Cr (200) interplanar spacing.
Figure 5B:
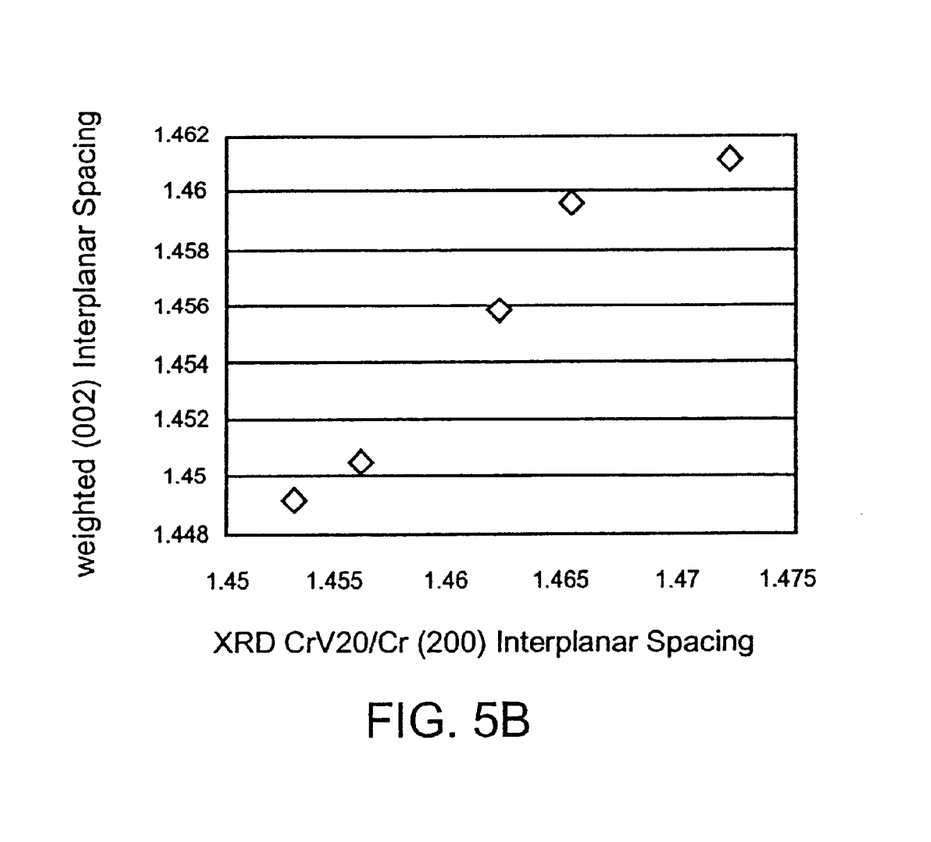
FIG. 5B plots (002) interplanar spacing for CrV20/Cr chromium-based layers versus the calculated weighted CrV20/Cr (200) lattice spacing.

The measured $d_{200}$ is plotted against $T_{CrV20}/T_{Cr}$ in FIG. 5B and it shows a linear relation for the most part. One can also calculate the thickness weighted average (002) interplanar spacing ($a_{theo}$) of the $CrV_{20}/Cr$ underlayer:

$$a_{theo} = \frac{t_{Cr}*a_{Cr} + t_{CrX}*a_{CrX}}{t_{total}} \quad (4)$$

A good linear fit can be obtained between the experimental and calculated values (FIG. 5A) which indicates that not only can one change the $CrV_{20}/Cr$ (002) underlayer lattice spacing through $t_{CrV20}/t_{Cr}$ but one can also predict the resulting a once the upper and lower thickness ratio are defined.

The slope between measured results and that obtained from (4) is not unity in FIG. 5A. This can be attributed to the epitaxial strain between the two layers. CrV20 nanocrystalline grains grow epitaxially on Cr grains. The Cr grain size is replicated and both lattices are strained simultaneously. This consequently leads to the shift in the overall underlayer lattice parameter as shown above. Due to the nanocrystallinity of the grains and an abundance of strain relieving grain boundaries/free surfaces, the nature of the epitaxial strain is complex and it cannot be easily predicted in a linear fashion. This may account for the shift between the measured and calculated values.

Figure 6:
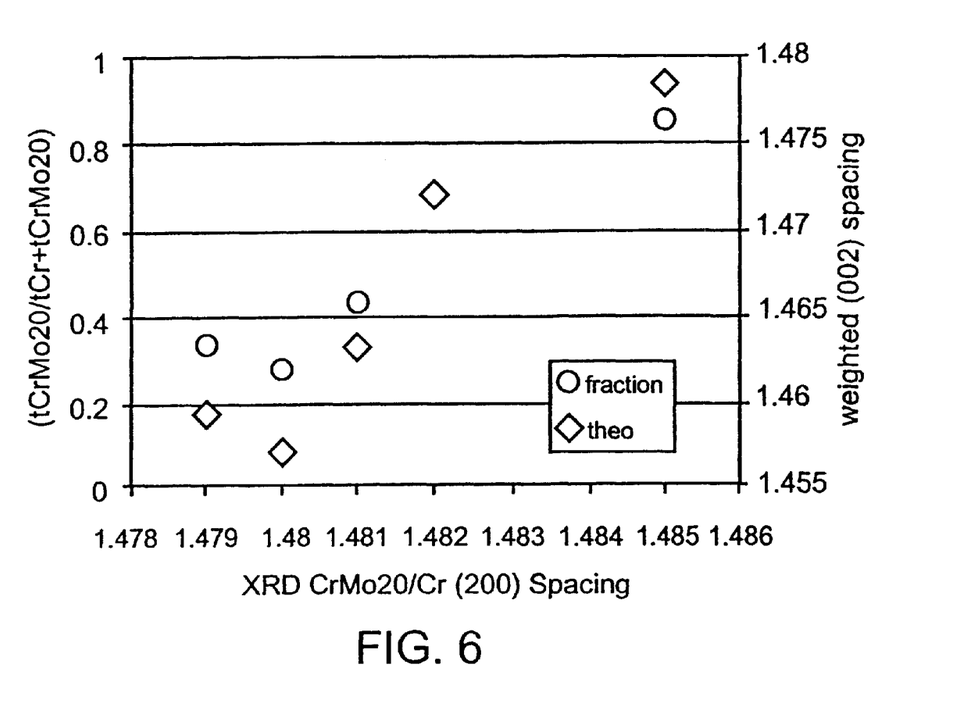
FIG. 6 plots CrMo20/Cr fraction and the calculated (002) spacing versus measured CrMo20/Cr (200) lattice spacing.
Figure 7:
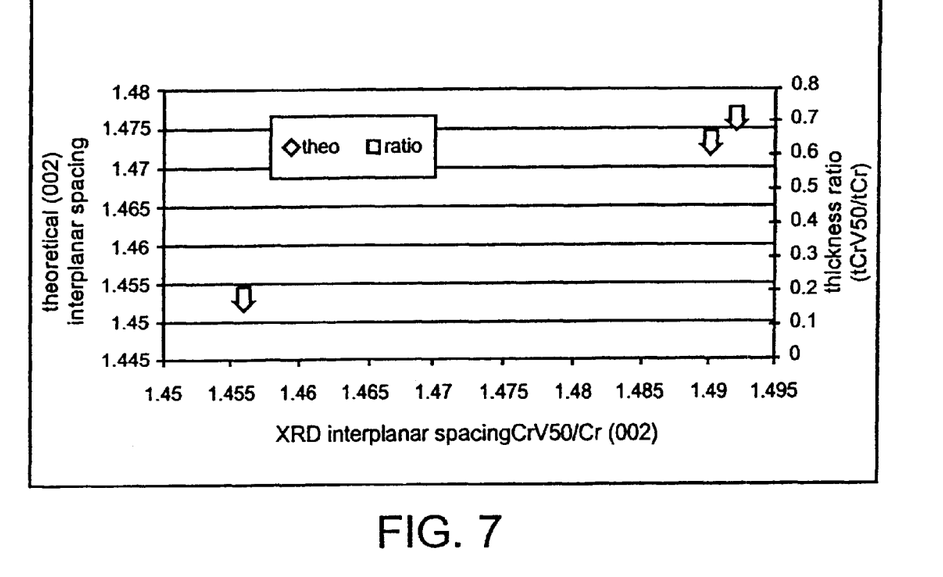
FIG. 7 plots calculated tCr/V50/(tCr+tCrV50) thickness fraction versus measured CrV50/Cr (002) interplanar spacing.

Similar linear trends were observed in $CrMo_{20}/Cr$ and $CrV_{50}/Cr$ dual underlayers between the measured spacing, thickness ratio and predicted values. However, the agreement between the calculated values and the measured spacing is not as good as the case with $CrV_{20}/Cr$. The relationship between the three quantities for $CrMo_{20}/Cr$ and $CrV_{50}/Cr$ are shown in FIGS. 6 and 7, respectively. Although it basically scales linearly with $t_{CrMo20}/t_{Cr}$ and $t_{CrV50}/t_{Cr}$, the range of the measured $d_{200}$ is much narrower than the one predicted using (4). This could be due to the larger lattice misfit between Cr and $CrMo_{20}$ and $CrV_{50}$ which makes the epitaxial strain more non-linear.

FIG. 8 plots the relationship between Mrt, $fCrMo_{20}$ and $fCrV_{50}$. A peak in $M_rt$ can be observed in both curves. The experimental $d_{110}$ was found to be 2.092 Å and 2.107 Å respectively for $CrMo_{20}/Cr$ and $CrV_{50}/Cr$. This falls within 0.8% of the (0002) spacing of CoCrTaPt, which is at 2.09 Å. The good lattice matching gives a higher $M_rt$ of almost 9% even though the magnetic film thickness remains constant. These results demonstrate that adjustment of the underlayer lattice using variable ratio layered underlayers is a viable alternative to optimizing the underlayer lattice dimension through binary alloy composition adjustment. The technique represents a less complex avenue to choosing the correct underlayer CrX composition.

Figure 8A:
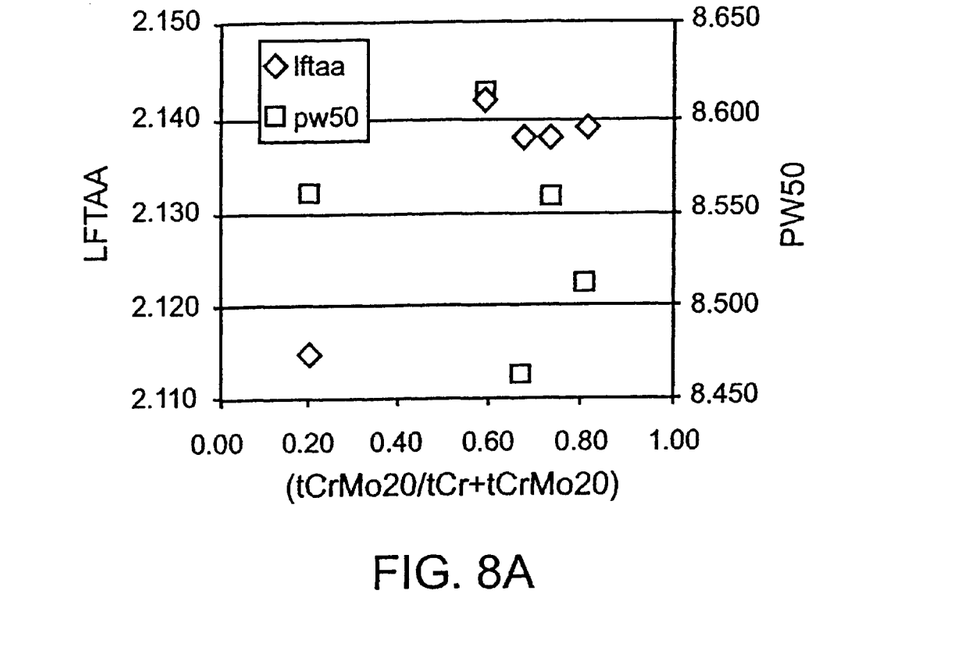
FIG. 8A plots the effect of $t_{CrMo20}/t_{Cr}$ on LFTAA and PW50.
Figure 8B:
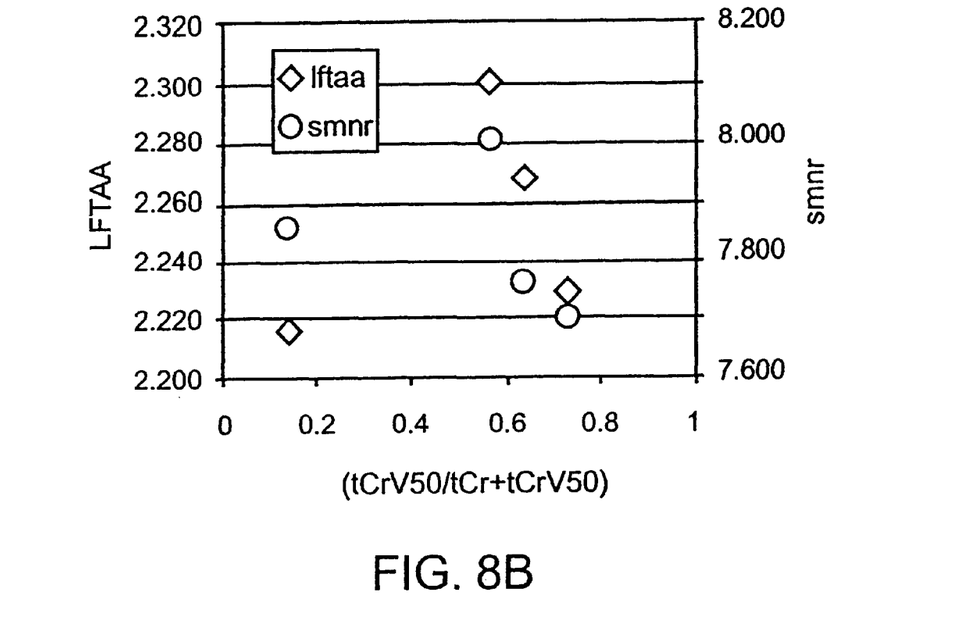
FIG. 8B plots the effect of $t_{CrMo20}/t_{Cr}$ on LFTAA and SMNR.

The interplay between thickness ratio, low frequency track-average-amplitude (LFTAA), pulse width ($PW_{50}$), signal-to-media-noise-ratio (SMNR), $fCrMo_{20}$ and $fCrV_{50}$ is shown in FIGS. 8A and 8B. LFTAA is at or near maximum for the fraction which maximizes Mrt. However, $PW_{50}$ is not maximized nor is SMNR minimized, as one would expect according to normal parametric scaling. This is because the high amplitude arises from better matching between the magnetic layer and the underlayer but not from a thicker magnetic layer. This matching results in a narrower transition and better parametric performance.

III. Conclusions

The film lattice parameter, a, of CrX can be predicted using the weighted atomic radius between Cr and X, although this dimension can change depending on sputtering conditions. Parameter a can also be modified and adjusted through the thickness ratio in a CrX/Cr multilayer construction. The resulting a can be predicted using the weighted thickness average. Proper adjustment of this ratio leads to optimal magnetic and parametric properties.

Modification and variation can be made to the disclosed embodiments of the invention without departing from the subject of the invention as defined in the following claims.

What is claimed is:

1. A method for obtaining a lattice parameter for a non-magnetic underlayer in the manufacture of a magnetic recording medium comprising a substrate, a non-magnetic underlayer over the substrate and a magnetic layer on the underlayer, comprising:

determining a lattice parameter for the magnetic layer;

selecting a plurality of non-magnetic, chromium-based layers for the underlayer, at least one of said chromium-based layers being a chromium alloy, and the chromium-based layers having different elemental compositions;

choosing a fractional thickness for each of the chromium-based layers according to the lattice parameter of the magnetic layer, the sum of the fractional thicknesses for each of the chromium-based layers being equal to the underlayer thickness;

depositing the chromium-based layers over the substrate; and depositing the magnetic layer on and in contact with one of the chromium-based layers.

2. The method of claim 1 wherein the selecting step selects two of said chromium-based layers.

3. The method of claim 2 wherein the choosing step is carried out using a ratio of the two fractional thickness of said two chromium-based layers versus corresponding (002) interplanar spacing as the lattice parameter of the magnetic layer.

4. The method of claim 3 wherein the choosing step is carried out using a plot of said ratio versus said (002) interplanar spacing.

5. The method of claim 1 wherein the choosing step is carried out so that the difference between the lattice parameter of the underlayer and the lattice parameter of the magnetic layer is optimized.

6. The method of claim 1 wherein the selecting and choosing steps are carried out so that the lattice parameter of the underlayer is between the lattice parameters of the chromium-based layers.

7. The method of claim 6 wherein the choosing step is carried out so that the difference between the lattice parameter of the underlayer and the lattice parameter of the magnetic layer is optimized.

8. A method for obtaining a lattice parameter for a non-magnetic underlayer in the manufacture of a magnetic recording medium comprising a substrate, a non-magnetic uniderlayer with a body centered cubic lattice structure over the substrate and a magnetic layer with a hexagonal close-packed lattice structure on the underlayer, comprising:

determining a lattice parameter for the magnetic layer;

selecting first and second non-magnetic, chromium-based layers for the underlayer, at least one of said chromium-based layers being a chromium-based alloy, and the chromium-based layers having different elemental compositions;

choosing a fractional thickness for each of the chromium-based layers using a ratio of the fractional thicknesses for said chromium-based layers versus the lattice parameter for the magnetic layer, the sum of the fractional thicknesses for each of the chromium-based layers being equal to the underlayer thickness;

depositing the chromium-based layers over the substrate; and depositing the magnetic layer on and in contact with one of the chromium-based layers.

9. A method of manufacturing a magnetic recording medium that includes a substrate, a non-magnetic underlayer and a magnetic layer, comprising:

providing the substrate;

depositing the underlayer over the substrate, wherein the underlayer includes first and second chromium-based layers, the first and second chromium-based layers have different elemental compositions, at least one of the first and second chromium-based layers is a chromium alloy, the first chromium-based layer has a first thickness, the second chromium-based layer has a second thickness, and the first and second thicknesses are selected in response to a lattice parameter of the magnetic layer so that a lattice parameter of the underlayer is pulled between the lattice parameters of the first and second chromium-based layers and the lattice parameter of the magnetic layer is closer to the lattice parameter of the underlayer than the lattice parameter of the chromium alloy; and depositing the magnetic layer on the underlayer.

10. The method according to claim 9 wherein the underlayer consists of the first and second chromium-based layers.

11. The method according to claim 9 wherein the underlayer has a body centered cubic lattice structure.

12. The method according to claim 9 wherein the magnetic layer is a cobalt platinum alloy.

13. The method according to claim 9 wherein the magnetic layer has a hexagonal close-packed lattice structure.

14. The method according to claim 9 wherein the underlayer has a body centered cubic lattice structure, and the magnetic layer has a hexagonal close-packed lattice structure.

15. The method according to claim 9 wherein the first and second thicknesses are selected using a plot of a ratio of the thicknesses of the first and second chromium-based layers versus corresponding (002) interplanar spacing as the lattice parameter of the magnetic layer.

16. The method according to claim 15 wherein the underlayer consists of the first and second chromium-based layers.

17. The method according to claim 15 wherein the underlayer has a body centered cubic lattice structure.

18. The method according to claim 15 wherein the magnetic layer is a cobalt platinum alloy.

19. The method according to claim 15 wherein the magnetic layer has a hexagonal close-packed lattice structure.

20. The method according to claim 15 wherein the underlayer has a body centered cubic lattice structure, and the magnetic layers a hexagonal close-packed lattice structure.

21. The method according to claim 9 including depositing a seedlayer on the substrate, depositing the underlayer on the seedlayer, depositing a protective layer on the magnetic layer, and depositing a lubricant on the protective layer.

* * * * *